Sept. 6, 1966　　　　L. H. CAVENY　　　　3,270,560
CRITICAL CONDITION INDICATOR
Filed Feb. 19, 1964

Leonard H. Caveny INVENTOR.

BY

ATTORNEY

United States Patent Office 3,270,560
Patented Sept. 6, 1966

3,270,560
CRITICAL CONDITION INDICATOR
Leonard H. Caveny, Huntsville, Ala., assignor to Thiokol Chemical Corporation, Bristol, Pa., a corporation of Delaware
Filed Feb. 19, 1964, Ser. No. 345,971
1 Claim. (Cl. 73—344)

This invention relates to improvements in indicators that will be used to detect intolerable conditions that will affect the solid propellant of a rocket motor so that such motor may be unable to achieve its mission.

Any information that can be obtained from the use of critical condition indicators can be used to decrease the uncertainty that arises from the effects of environment on solid propellant rocket motors.

The design and selection, however, of such an indicator will require careful evaluation of many variables and considerations associated with a particular motor and its mission.

One of the desired characteristics of a critical condition indicator is its ability to provide "go"-"no go" data that is suitable for use in the field. The indication of a "go" condition for a rocket motor is one in which the rocket motor has not been subjected to intolerable conditions. The indications of a "no go" condition for a rocket motor will be associated with rocket motors that must be examined by sufficiently-trained personnel that must exercise their technical judgment with regard to the ability of the rocket motor to achieve its mission.

The critical condition indicator must be simple in construction and inexpensive to produce yet rugged enough to withstand field handling conditions encountered by mobile propulsion systems. The critical condition indicator must include in its assembly a portion thereof that is adapted to be either mounted on the rocket motor or mounted on the transportation for the rocket motor, and it should be able to remain in operational relation with the rocket motor at all times until it is ready for firing.

Under field conditions, mobile propulsion systems will experience a wide range of environment which will result in temperature changes and corresponding thermal gradients across the solid propellant. These temperature changes and gradients will have an effect on the performance characteristics of the rocket motor and the physical properties of the solid propellant.

It is an object of this invention, therefore, to provide a critical condition indicator that will detect if a predetermined critical condition has existed under certain climatic and acceleration conditions that will be affected by the temperature changes of the solid propellant.

Since the solid propellant will experience acceleration that is based on the magnitude and the direction thereof, the effects caused by such acceleration are determined by the temperature of the solid propellant. The critical condition indicator will, therefore, consider a two-dimensional acceleration, and the predetermined critical condition to be detected thereby will be a function of the temperature of the solid propellant.

It is another object of the invention, therefore, to provide a critical condition indicator that can be mounted in relation to a rocket motor so that the indicator can receive the same acceleration as the rocket motor and it operate under the same conditions that will affect the solid propellant in the rocket motor.

With the above and other objects and advantages in view, the invention consists of the novel details of construction, arrangement, and combination of parts more fully hereinafter described, claimed and illustrated in the accompanying drawings in which:

Figure 1:
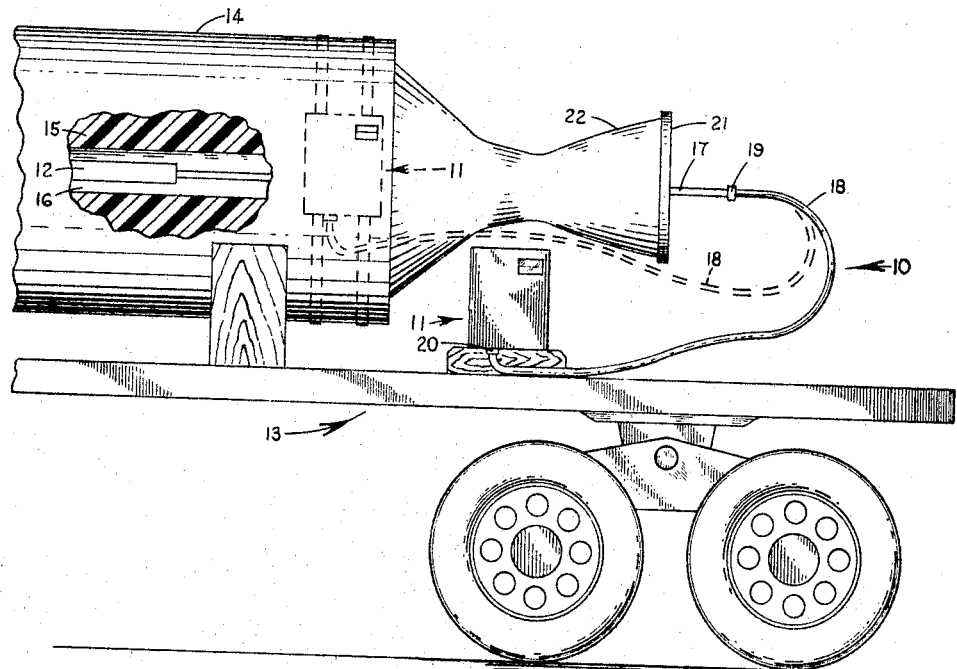
FIGURE 1 is a partial elevational view of a mobile propulsion system showing in elevation one method of mounting the critical condition indicator and, in dotted lines, another method of mounting the critical condition indicator embodying the invention.

Referring more in detail to the drawings wherein like parts are designated by like reference numerals, the reference numeral 10 is used to generally designate a critical condition indicator embodying the invention.

The critical condition indicator 10 comprises an indicating assembly 11 and a temperature sensor 12. The indicating assembly 11 is mounted on a transporter 13 for a solid propellant rocket motor 14. The transporter 13 may be of any design or designation that would transport the rocket motor 14 during field maneuvers or from place of assembly to the firing pad.

The rocket motor 14 has a solid propellant 15 therein, and the propellant is provided with the conventional cavity configuration 16. The temperature sensor 12 is positioned in the cavity configuration 16 so that it will be affected by any temperature changes within the propellant 15. The temperature sensor 12 is of the bulb type having therein a liquid that, by temperature changes, is caused to expand and contract between high and low temperature ranges.

A rigid tube or pipe 17 has direct communication with the interior of the temperature sensor 12 so that the fluid therein may be conducted directly to the indicating assembly 11 by means of a flexible tube or pipe 18, one end of which is connected to a coupling 19 on the outer end of the tube 17 and the other end of which is connected to a coupling 20 for the indicating assembly 11. The pipe 17 extends through a cylindrical closure 21 for the opening of the nozzle 22 of the rocket motor 14, and the closure 21 and pipe 17 retain the temperature sensor 12 in its predetermined position within the cavity 17 of the propellant 15 in the rocket motor 14.

The indicating assembly 11 comprises a housing 23 which may be of any shape or size and may be mounted on the transporter 13, as shown in full lines in FIGURE 1, or on the rocket motor 14, as shown by dotted lines in the same figure.

Figure 2:
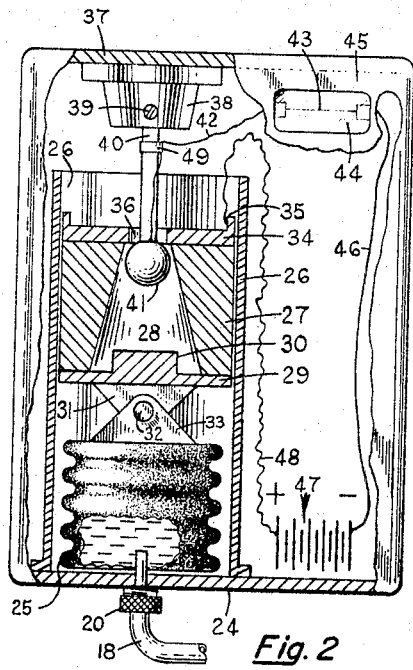
FIGURE 2 is a view, partly in elevation and partly in section, of the critical condition indicator as it will be affected by a low temperature.
Figure 3:
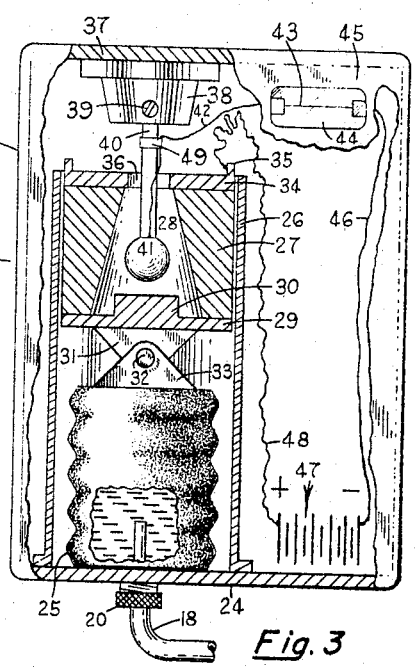
FIGURE 3 is a similar view showing the critical condition indicator as it will be affected by a high temperature.

The coupling 20 is mounted on and extends through the bottom or floor 24 of the housing 23, and a bellows 25 is mounted in the housing 23 so that it is in direct communication with the coupling 20. A sleeve 26 is secured at one end to the floor 24 of the housing 23 and is so arranged therein that it is in circumjacent relation to the bellows 25, as shown in FIGURES 2 and 3.

Mounted for reciprocal movement within the sleeve 26 is a circular movable contact 27 which has a cavity 28 therein. The contact 27 also has a circular bottom plate member 29 which has a circular stop projection 30 on one side thereof within the cavity 28 and a triangular-shaped projection 31 on the opposite side thereof. The projection 31 being pivotally connected by a pivot pin 32 to a triangular-shaped projection 33 that is rigidly connected to the upper end of the bellows 25.

The contact 27 has a circular top plate member 34 that is provided with an annular terminal member 35 that is contiguous with the periphery of the member 34 and a central opening 36 therein, the radial dimensions of which are slightly less than the radial dimensions of the smallest radial diameter of the cavity 28.

Secured to the top or ceiling 37 of the housing 23 in vertical axial alignment with the sleeve 26 is a circular pedestal base 38 to which is secured by means of a set screw 39 a flexible pedestal 40. The pedestal 40 which is made of a non-conductive material depends from the base 38 through the opening 36 in the plate 34 into the cavity 28, and a fixed ball-like contact or weight 41 is rigidly secured to the lower end of the pedestal 40 within the cavity 28.

A conductive wire 42 is connected at one end to the contact 41 and at the opposite end to a fuse element 43 that is mounted in the housing 23 and is outwardly visible by means of a window 44 in the front 45 of the housing 23. A conductive wire 46 is connected at one end to the fuse element 43 and at the opposite end to one pole of a battery 47. A second conductive wire 48 connected to the opposite pole of the battery 47 at one end thereof is connected at its opposite end to the terminal 35 on the plate 34 of the contact 27. Thus a complete inactive circuit is completed between the terminal 35 on the plate 34 of the contact 27, the battery 47 and the weight 41. A clip 49 on the pedestal 40 serving to keep the conductive wire 42 out of contact with the plate 34 or sleeve 26.

The critical condition indicator 10 embodying the invention will meet the requirements for indicating if a predetermined temperature dependent acceleration limit has been exceeded. As previously stated, the indicator 10 is mounted so that it will experience the same acceleration as the rocket motor 14. The pedestal 40 by reason of its flexibility will have a transverse movement within the contact 27 but will be fixed as to vertical movement. The size of the cavity 28 will be calibrated with the size of the weight 41 to indicate maximum acceleration through all predetermined temperature ranges.

The weight 41 will contact the plate 34 at a maximum low temperature, and the stop 30 at a maximum high temperature because such temperatures indicate critical conditions that will affect the propellant 15.

As previously stated, the contact 27 will be moved by the expansion and contraction of the fluid within the temperature sensor 12 and bellows 25 so that only a slight transverse movement of the weight 41 is required to engage the contact 27 at low temperatures while the movement must increase at high temperatures, as shown in FIGURES 2 and 3. Thus the predetermined maximum acceleration limits are determined by the temperature ranges that affect the movement of the contact 27. The size of the temperature sensor 12 being determined by the movement of the weight 41 in relation to the size of the cavity 28 within the contact 27.

At any engagement of the weight 41 with the contact 27 as previously described, the inactive circuit, previously referred to, will be activated and the fuse element 43 will be ruptured to indicate that a critical condition has affected the solid propellant 15. Such engagement may be only momentary, but it will be of sufficient duration to cause the indicator 10 to function in the manner described.

It is believed that, from the foregoing description, the manner of the construction and operation of the critical condition indicator embodying the invention will be clear to those skilled in the art; and it is to be understood that any variations in the manner of the construction thereof may be made providing such variations fall within the spirit of the invention and the scope of the appended claim.

Having thus described the invention, what is claimed as new and desired to be secured by Letters Patent is:

A critical condition indicator for use within a solid propellant rocket motor having a solid propellant therein provided with a central cavity comprising a temperature sensor that is positioned within the cavity within the solid propellant, an indicating assembly positioned externally of the rocket motor, fluid conducting means connecting the temperature sensor to the indicating assembly, said indicating assembly including a movable contact having a frusto-conical shaped cavity therein, a fixed contact positioned within said cavity, actuating means communicating with said fluid conducting means and connected to said movable contact and an inactive electrical circuit between said movable and fixed contacts that is activated when said movable contact is in engagement with said fixed contact.

References Cited by the Examiner

UNITED STATES PATENTS

| | | | |
|---|---|---|---|
| 2,694,929 | 11/1923 | White | 73—343 |
| 2,700,716 | 1/1925 | Grooms | 73—368.7 |
| 3,096,691 | 7/1963 | Salmon | 73—368 |
| 3,107,533 | 10/1963 | Le Van et al. | 73—368.4 |

LOUIS R. PRINCE, *Primary Examiner.*

J. RENJILIAN, *Assistant Examiner.*